United States Patent
Jaradi et al.

(10) Patent No.: US 12,384,314 B2
(45) Date of Patent: Aug. 12, 2025

(54) EXTENDABLE SEATBELT ANCHOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 18/164,973

(22) Filed: Feb. 6, 2023

(65) Prior Publication Data
US 2024/0262307 A1 Aug. 8, 2024

(51) Int. Cl.
*B60R 21/01* (2006.01)
*B60R 22/19* (2006.01)
*B60R 22/22* (2006.01)

(52) U.S. Cl.
CPC .............. *B60R 21/01* (2013.01); *B60R 22/19* (2013.01); *B60R 2021/01272* (2013.01); *B60R 22/22* (2013.01)

(58) Field of Classification Search
CPC ......... B60R 21/01; B60R 22/19; B60R 22/22; B60R 22/28; B60R 22/03; B60R 2021/01272
See application file for complete search history.

(56) References Cited

U.S. PATENT DOCUMENTS

| | | | |
|---|---|---|---|
| 6,883,834 B2* | 4/2005 | Grabowski | B60R 22/03 280/802 |
| 7,458,609 B2* | 12/2008 | Gyllenspetz | B60R 22/03 280/801.1 |
| 8,469,400 B2 | 6/2013 | Merrill et al. | |
| 2002/0003344 A1* | 1/2002 | Maeda | B60R 21/01516 280/733 |
| 2003/0030264 A1* | 2/2003 | Motozawa | B60R 22/1952 280/806 |
| 2003/0184076 A1 | 10/2003 | Devereaux et al. | |
| 2018/0319361 A1 | 11/2018 | Faraque et al. | |
| 2018/0345893 A1* | 12/2018 | Imanaka | B60R 21/01516 |
| 2019/0337482 A1 | 11/2019 | Grzic | |

FOREIGN PATENT DOCUMENTS

JP 201536291 A 2/2015

* cited by examiner

*Primary Examiner* — George C Jin
(74) *Attorney, Agent, or Firm* — Frank A. MacKenzie; Brooks Kushman P.C.

(57) ABSTRACT

A system includes a seatbelt anchor, a seatbelt webbing extending from the seatbelt anchor; and a motor operatively coupled to the seatbelt anchor to move the seatbelt anchor between a first position and an extended position. The system includes a computer having a processor and a memory storing instructions executable by the processor to activate the motor to move the seatbelt anchor from the first position to the extended position in response to determining that tension in the seatbelt webbing is above a predetermined threshold in the absence of detection of a vehicle impact.

20 Claims, 7 Drawing Sheets

EXTENDABLE SEATBELT ANCHOR

BACKGROUND

A vehicle may include a seatbelt assembly. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent a seat of the vehicle. The webbing may extend continuously from the seatbelt retractor to the anchor. For example, one end of the webbing feeds into the seatbelt retractor, and the other end of the webbing is fixed to the anchor. The anchor may for example, be fixed to the seat. Alternatively, the anchor may be fixed to a vehicle body, e.g., a B-pillar, a floor, etc. The anchor may be attached in any suitable manner, e.g., with fasteners. The webbing may be fabric, e.g., woven polyester. The latch plate slides freely along the webbing and, when engaged with the buckle, divides the webbing into a lap band and a shoulder band. The seatbelt assembly may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle body, e.g., the B-pillar. The seatbelt assembly may be a three-point harness, meaning that the webbing is attached at three points around the occupant when fastened the anchor, the seatbelt retractor, and the buckle. The seatbelt assembly may alternatively, include another arrangement of attachment points.

DETAILED DESCRIPTION

A system includes a seatbelt anchor, seatbelt webbing extending from the seatbelt anchor, and a motor operatively coupled to the seatbelt anchor to move the seatbelt anchor between a first position and an extended position. A computer has a processor and a memory storing instructions executable by the processor to activate the motor to move the seatbelt anchor from the first position to the extended position in response to determining that tension in the seatbelt webbing is above a predetermined threshold in the absence of detection of a vehicle impact.

The memory may store instructions executable by the processor to, after moving the seatbelt anchor to the extended position, activate the motor to return the buckle to the first position in response to determining that the tension in the seatbelt webbing is below the threshold.

The seatbelt anchor may include a base segment and a moveable segment moveable relative to the base segment between the first position and the extended position. A lock may be moveable between an engaged position engaged with the moveable segment in the first position and a disengaged position disengaged with the moveable segment. The solenoid in the extended position locks the moveable segment relative to the engaged position in the first position. The memory may store instructions executable by the processor to, in response to determining that tension in the seatbelt webbing is above a predetermined threshold in the absence of detection of a vehicle impact, move the lock to the disengaged position prior to activating the motor. A rack may be on one of the motor and the moveable segment and a pinion may be on the other of the motor and the moveable segment. The pinion is meshed with the rack. The motor may be fixed to the base segment of the seatbelt anchor. The lock may be fixed to the base segment of the seatbelt anchor. The lock may be a solenoid. A seatbelt-tension sensor may be coupled to the seatbelt webbing.

The memory storing instructions executable by the processor to detect the size of an occupant of the seat and to control operation of the solenoid and motor based on the detected size of the occupant.

A seatbelt assembly includes a seatbelt anchor having a base segment and a moveable segment moveable relative to the base segment between a first position and an extended position, seatbelt webbing extending from the seatbelt anchor, and a motor operatively coupled to the anchor to move the moveable segment between the first position and the extended position. A lock is moveable between an engaged position engaged with the moveable segment in the first position and a disengaged position disengaged with the moveable segment. The solenoid in the extended position locks the moveable segment relative to the engaged position in the first position.

A rack may be on one of the motor and the moveable segment and a pinion may be on the other of the motor and the moveable segment. The pinion is meshed with the rack.

The motor may be fixed to the base segment of the seatbelt anchor.

The lock may be fixed to the base segment of the seatbelt anchor.

A computer has a processor and a memory storing instructions executable by the processor to, in response to determining that tension in the seatbelt webbing is above a predetermined threshold in the absence of detection of a vehicle impact, move the lock to the disengaged position and activate the motor to move the moveable segment relative to the base segment from the first position to the extended position. The memory may store instructions executable by the processor to, after moving the seatbelt anchor to the extended position, activate the motor to return the buckle to the first position in response to determining that the tension in the seatbelt webbing is below the threshold.

A seatbelt-tension sensor may be coupled to the seatbelt webbing.

The memory stores instructions executable by the processor to detect the size of an occupant of the seat and to control operation of the lock and motor based on the detected size of the occupant.

The lock may be a solenoid.

With reference to the Figures, where like numerals indicate like features throughout the several views, an example of a system 10 of a vehicle 28 includes a seatbelt anchor 12, a seatbelt webbing 14 extending from the seatbelt anchor 12, and a motor 16 operatively coupled to the seatbelt anchor 12 to move the seatbelt anchor 12 between a first position and an extended position. The system 10 includes a computer 18 having a processor and a memory storing instructions executable by the processor to activate the motor 16 to move the seatbelt anchor 12 from the first position to the extended position in response to determining that tension in the seatbelt webbing 14 is above a predetermined threshold in the absence of detection of a vehicle impact.

An example of a seatbelt assembly 20 includes the seatbelt anchor 12 including a base segment 22 and a moveable segment 24 moveable relative to the base segment 22 between the first position and the extended position. The seatbelt assembly 20 includes the seatbelt webbing 14 extending from the seatbelt anchor 12. The motor 16 is operatively coupled to the seatbelt anchor 12 to move the moveable segment 24 between the first position and the extended position. A lock 26, e.g., a solenoid, is moveable between an engaged position engaged with the moveable segment 24 in the first position and a disengaged position disengaged with the moveable segment 24. The lock 26 in the extended position locks the moveable segment 24 relative to the engaged position in the first position.

Movement of the seatbelt anchor 12 to the extended position may reduce tension in the seatbelt webbing 14, e.g., permitting unlocking of a seatbelt retractor 30 such that the seatbelt webbing 14 is payable into and/or out of the seatbelt retractor 30, providing increased range of movement for an occupant, etc. Unlocking of the seatbelt retractor 30 and the resultant increased range of movement helps to provide an enhanced occupant experience in situations where the seatbelt retractor 30 locks in the absence of a vehicle impact, e.g., locking of the seatbelt retractor 30 caused by the occupant leaning forward too quickly, the vehicle 28 being positioned on a steep decline, the vehicle 28 traversing a particularly bumpy surface, etc.

Figure 1:
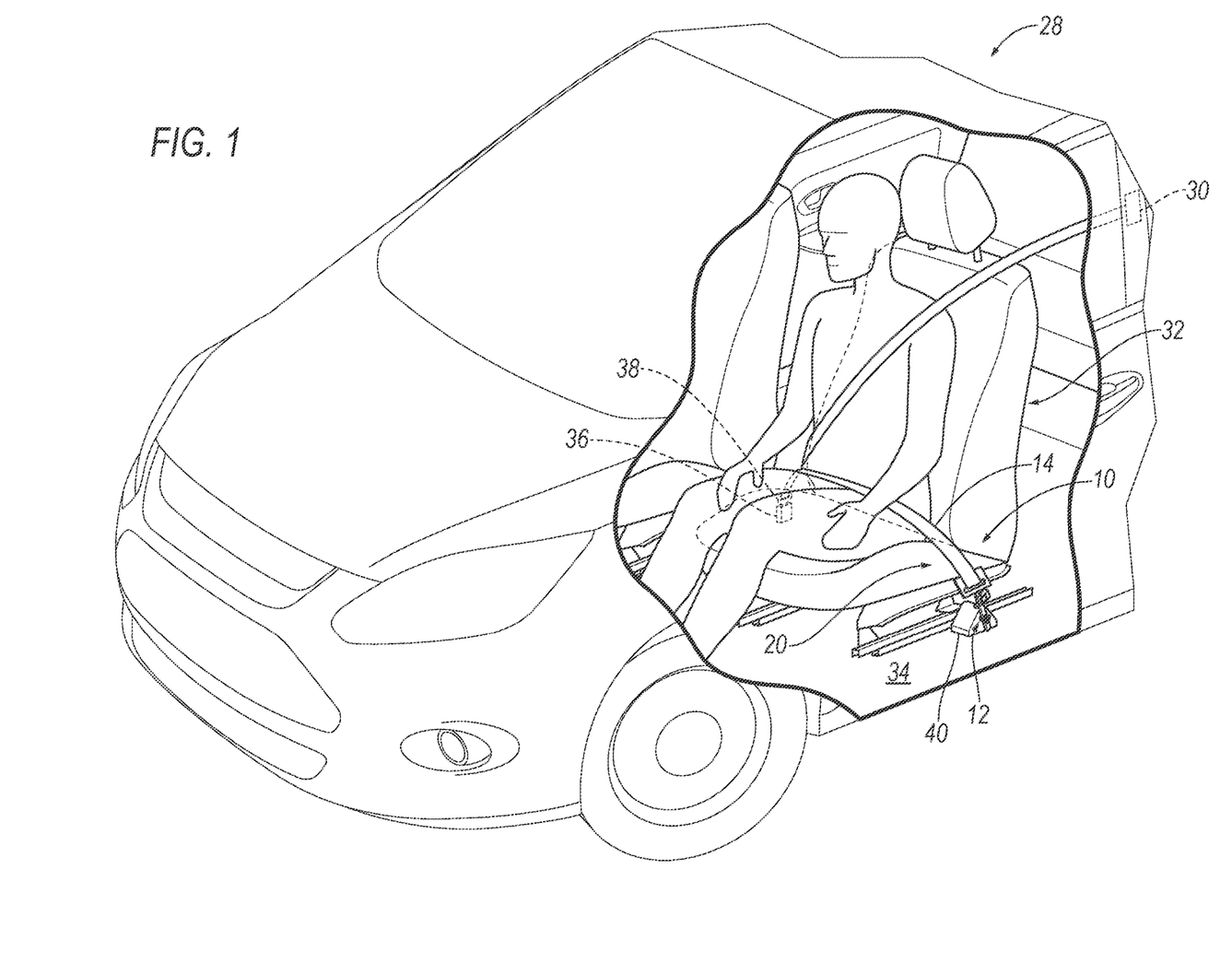
FIG. 1 is a perspective view of a vehicle including a seat and a seatbelt anchor.
Figure 2:
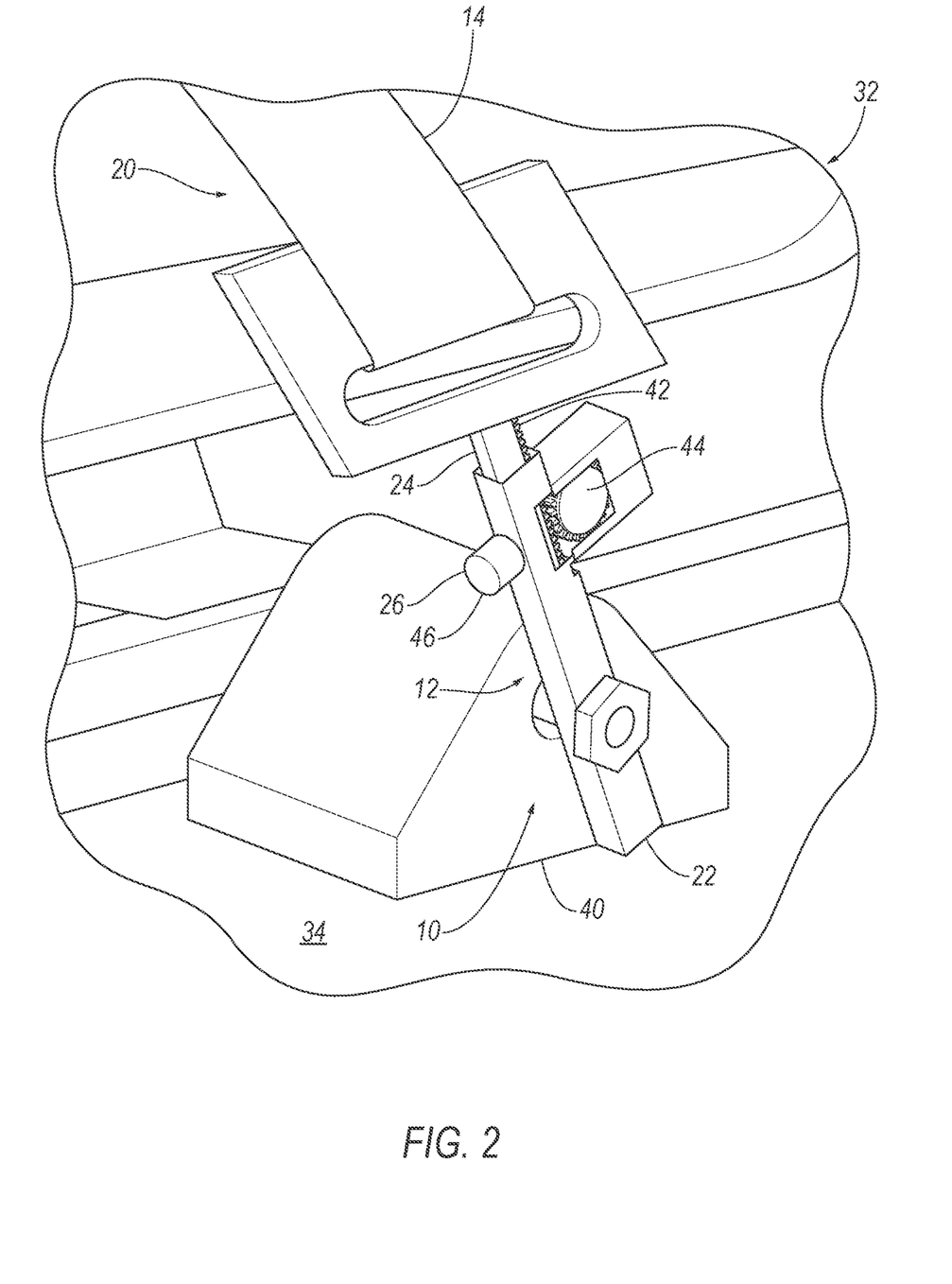
FIG. 2 is a magnified view of a portion of FIG. 1 with the seatbelt anchor in a first position.
Figure 3:
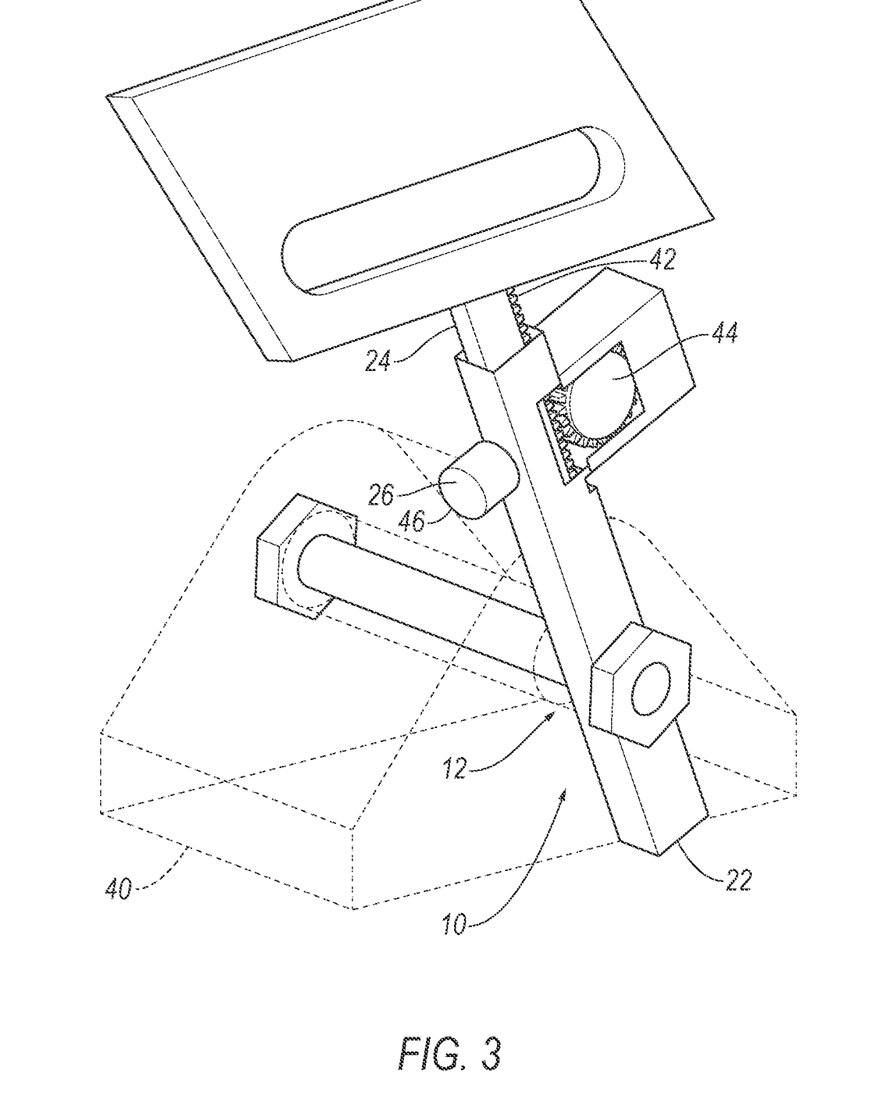
FIG. 3 is a perspective view of the seatbelt anchor in the first position.

The vehicle 28, shown in FIG. 1, may be any suitable type of ground vehicle, e.g., a passenger or commercial automobile such as a sedan, a coupe, a truck, a sport utility, a crossover, a van, a minivan, a taxi, a bus, etc.

The vehicle 28 includes one or more seats 32. The seats 32 may be arranged in the passenger cabin in any suitable position, i.e., as front seats (including front driver and passenger seats), rear seats, third-row seats, etc. The seats 32 may be supported by a floor 34 of the vehicle 28. The seats 32 may be movable relative to the floor 34 to various positions, e.g., movable fore-and-aft and/or cross-vehicle. The seats 32 may be of any suitable type, e.g., a bucket seat 32. In examples including more than one seat 32, each seat 32 or any one or more of the seats 32 may include a respective seatbelt assembly 20.

Each of the seats 32 includes a seatback and a seat bottom. The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other.

Each seatbelt assembly 20 includes the seatbelt retractor 30. The seatbelt webbing 14 is retractably payable from the seatbelt retractor 30. The seatbelt assembly 20 includes the seatbelt anchor 12 fixed to the seatbelt webbing 14 with the seatbelt webbing 14 extending from the seatbelt anchor 12 to the seatbelt retractor 30. The seatbelt assembly 20 includes a buckle 36 and a latch plate 38 that releasably engages the buckle 36. The seatbelt assembly 20 may be disposed adjacent the seat 32. As an example, the seatbelt assembly 20 is shown adjacent the front driver seat. The seatbelt assembly 20 controls kinematics of the occupant of the respective the seat 32, e.g., during sudden decelerations of the vehicle 28. The seatbelt webbing 14 may extend continuously from the seatbelt retractor 30 to the seatbelt anchor 12. For example, one end of the seatbelt webbing 14 feeds into the seatbelt retractor 30, and the other end of the seatbelt webbing 14 is fixed to the seatbelt anchor 12. The seatbelt anchor 12 may, for example, be fixed to the floor 34, as shown in the example in the Figures. As other examples, the seatbelt anchor 12 may be fixed to a pillar, the seat 32, etc. The seatbelt anchor 12 may be attached to the seat 32 in any suitable manner, e.g., with fasteners. The seatbelt webbing 14 may be fabric, e.g., woven polyester.

The latch plate 38 slides freely along the seatbelt webbing 14 and, when engaged with the seatbelt buckle 36, divides the seatbelt webbing 14 into a lap band and a shoulder band. The seatbelt assembly 20 may include a D-ring engaged with the seatbelt webbing 14. For example, the seatbelt webbing 14 may freely slide through the D-ring. In other words, the seatbelt webbing 14 may extend from the seatbelt anchor 12 through the D-ring to the seatbelt retractor 30. The D-ring may be spaced from the seatbelt retractor 30. For example, the D-ring may be disposed between the seatbelt retractor 30 and the roof. As another example, the seatbelt retractor 30 may be adjacent to the floor 34 and the D-ring may be adjacent to the roof. The D-ring may be fixed to the vehicle 28 body, e.g., a pillar. The seatbelt assembly 20 may be a three point harness, as shown in the example shown in the Figures.

The seatbelt retractor 30 may be moveable from the unlocked position to the locked position by conventional mechanisms currently known in the art. In the locked position, the seatbelt retractor 30 prevents extension of the seatbelt webbing 14 from the seatbelt retractor 30. The seatbelt retractor 30 may include a housing and a spool that is rotatable relative to the housing. The seatbelt retractor 30 may include a locking device engageable with the spool to restrict payout of the seatbelt webbing 14 from the retractor. In the unlocked position, the locking device allows payout of the seatbelt webbing 14 from and to the retractor and, in the locked position, the locking device restricts payout of the seatbelt webbing 14 from the retractor. The locking device may be any suitable locking device known in the art, e.g., weighted pendulum/pawl, centrifugal clutch, etc. With the spool in the unlocked position, the seatbelt webbing 14 may be extended from and retracted into the retractor. In other words, the seatbelt webbing 14 may be coiled and uncoiled freely about the spool. With the spool in the locked position, the seatbelt retractor 30 controls extension of the seatbelt webbing 14 to control the kinematics of the occupant in the event of certain vehicle impacts. Specifically, the spool is locked relative to the housing. In some examples, the seatbelt retractor 30 may include a torsion bar, load limiter, etc., including known structures in some examples, that allows for a limited amount of payout of the seatbelt webbing 14. The spool may be in the unlocked position by default, i.e., in the absence of a sudden deceleration. The spool may change from the unlocked position to the locked position during a sudden deceleration of the vehicle 28. Specifically, the locking device may engage the spool in response to deceleration of the vehicle 28, e.g., a sudden slowing of the vehicle 28, sudden stop, vehicle impact, etc. In other words, the locking device may be moved from the unlocked position to the locked position by a change in inertia. The locking device may engage the spool in response to an activation sensor. The activation sensor senses sudden deceleration of the vehicle 28 and triggers activation of the locking device, i.e., moves the locking device to the locked position. As one example, the activation sensor may be in the retractor and may be, for example, a weighted pendulum, a centrifugal clutch, or any other suitable type.

The seatbelt anchor 12 is moveable between the first position and the extended position. In the example shown in the Figures, the seatbelt anchor 12 includes a base segment 22 and a moveable segment 24 moveable relative to the base segment 22 between the first position and the extended position. Specifically, the moveable segment 24 is movable away from the base segment 22 from the first position, shown in FIGS. 1-4 to the extended position, shown in FIG. 5, and the moveable segment 24 is moveable toward the base segment 22 from the extended position to the first position. The movement of the seatbelt anchor 12 from the first position to the extended position reduces tension in the seatbelt webbing 14 when the latch plate 38 is coupled to the buckle 36 and the seatbelt retractor 30 is in the locked position.

The base segment 22 may support the moveable segment 24, i.e., the weight of the moveable segment 24 is borne by the base segment 22. The moveable segment 24 supports other components of the system 10, such as the motor 16, the solenoid, etc. In the example shown in the Figures, the base segment 22 is supported by a floor 34 of the vehicle 28. In other examples, the base segment 22 may be fixed to the seat 32 or any other suitable structure.

The seatbelt anchor 12 may include a mounting bracket 40 fixed to a component of the vehicle 28, e.g., the floor 34 in the example shown in the Figures. The mounting bracket 40 supports the base segment 22 and the moveable segment 24 on the floor 34, i.e., the weight of the base segment 22 and the moveable segment 24 are borne by the mounting bracket 40. The mounting bracket 40 may be fixed to the floor 34 in any suitable way, e.g., fasteners, welding, etc. The base segment 22 may be pinned to the mounting bracket 40. Specifically, a pin may extend through the base segment 22 and the mounting bracket 40. The base segment 22 may pivot about the pin.

The base segment 22 and the moveable segment 24 are moveable relative to each other. For example, one of the base segment 22 and the moveable segment 24 may telescopically receive the other of the base segment 22 and the moveable segment 24. In the example shown in the Figures, the base segment 22 telescopically receives the moveable segment 24. In such an example, the moveable segment 24 slides relative to the base segment 22 between the first position and the extended position.

The motor 16 is operatively coupled to the seatbelt anchor 12 to move the seatbelt anchor 12 between the first position and the extended position. In the example shown in the Figures, the motor 16 is anchored to the base segment 22 and is engaged with the moveable segment 24 to move the moveable segment 24 relative to the base segment 22 when the motor 16 is activated. The motor 16 moves the moveable segment 24 relative to the base segment 22 between the first position and the extended position. In the example shown in the Figures, the motor 16 has a casing fixed the base segment 22. The motor 16 includes an armature fixed to the casing and a shaft rotatable relative to the armature.

The system 10 includes a rack 42 on one of the motor 16 and the moveable segment 24 and a pinion 42 on the other of the motor 16 and the moveable segment 24. The pinion 42 is meshed with the rack 42. In the example shown in the Figures, the pinion is on the motor 16 and the rack 42 is on the moveable segment 24. Activation of the motor 16 rotates the pinion 44 to translate the rack 42 and moveable segment 24. The motor 16 may be of any suitable type, e.g., a DC motor including, for example, those as are known.

The lock 26 is moveable between an engaged position engaged with the moveable segment 24 in the first position and a disengaged position disengaged with the moveable segment 24. The lock 26 in the extended position locks the moveable segment 24 relative to the engaged position in the first position. As set forth further below, the lock 26 is moved to the disengaged position to release tension in the seatbelt webbing 14 and unlock 26 the retractor in the absence of a vehicle impact. In the event of a detection of a vehicle impact, the lock 26 is maintained in the engaged position. As shown in the example in the Figures, the lock 26 may be fixed to, i.e., anchored to, the first segment of the seatbelt anchor 12 and moveable into and out of engagement with the moveable segment 24.

Figure 4:
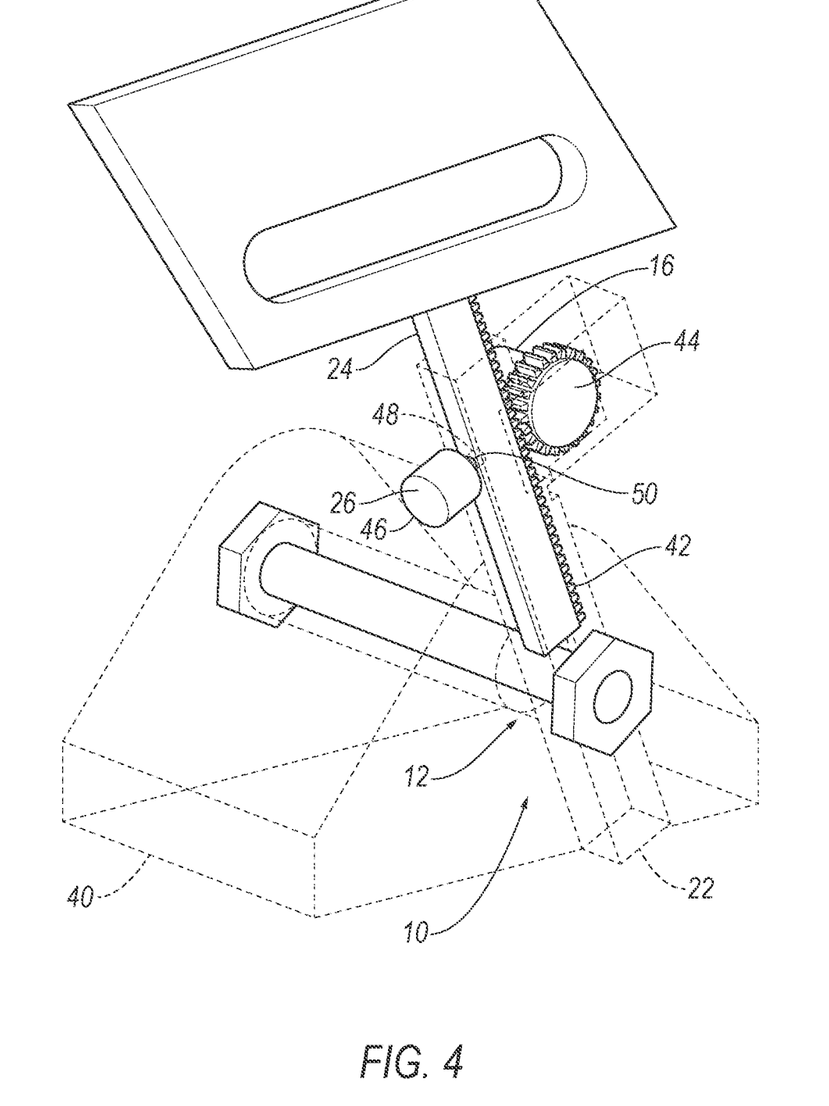
FIG. 4 is another perspective view of the seatbelt anchor in the first position.
Figure 5:
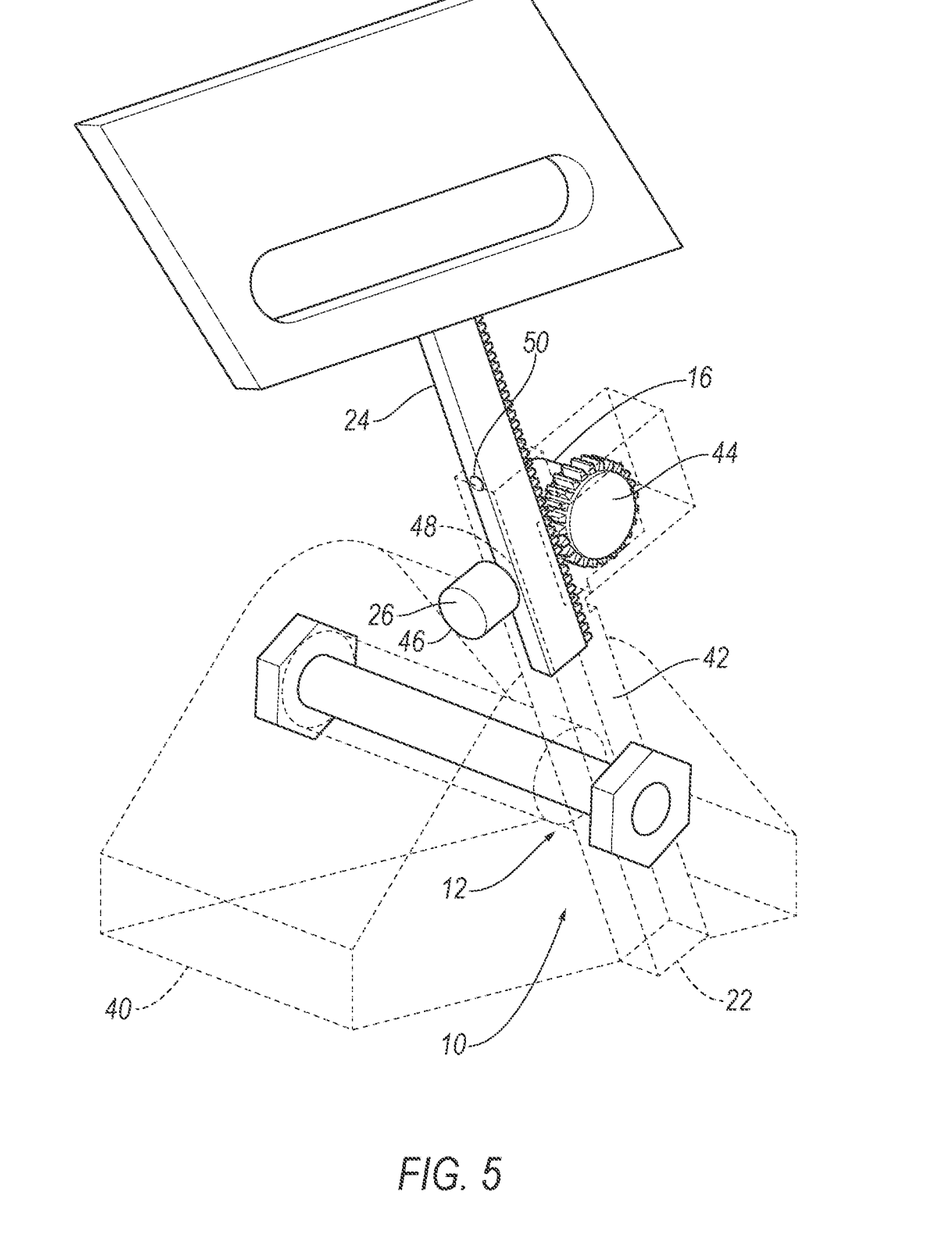
FIG. 5 is a perspective view of the seatbelt anchor in an extended position.

In the example shown in the Figures, the lock 26 is a solenoid. Specifically, in the example shown in the Figures, the solenoid includes a housing 46 and a plunger 48 extendable from and retractable into the housing 46 (by generation of a magnetic field as is known in the operation of a solenoid). With reference to FIGS. 4 and 5, the moveable segment 24 includes a hole 50 positioned to be aligned with the plunger 48 when the moveable segment 24 is in the first position. The plunger 48 is extended into the hole 50 in the engaged position to prevent movement of the moveable segment 24 relative to the base segment 22. The plunger 48 is retracted from the hole 50 in the disengaged position to allow movement of the moveable segment 24 relative to the first segment, i.e., by operation of the motor 16.

Figure 7:
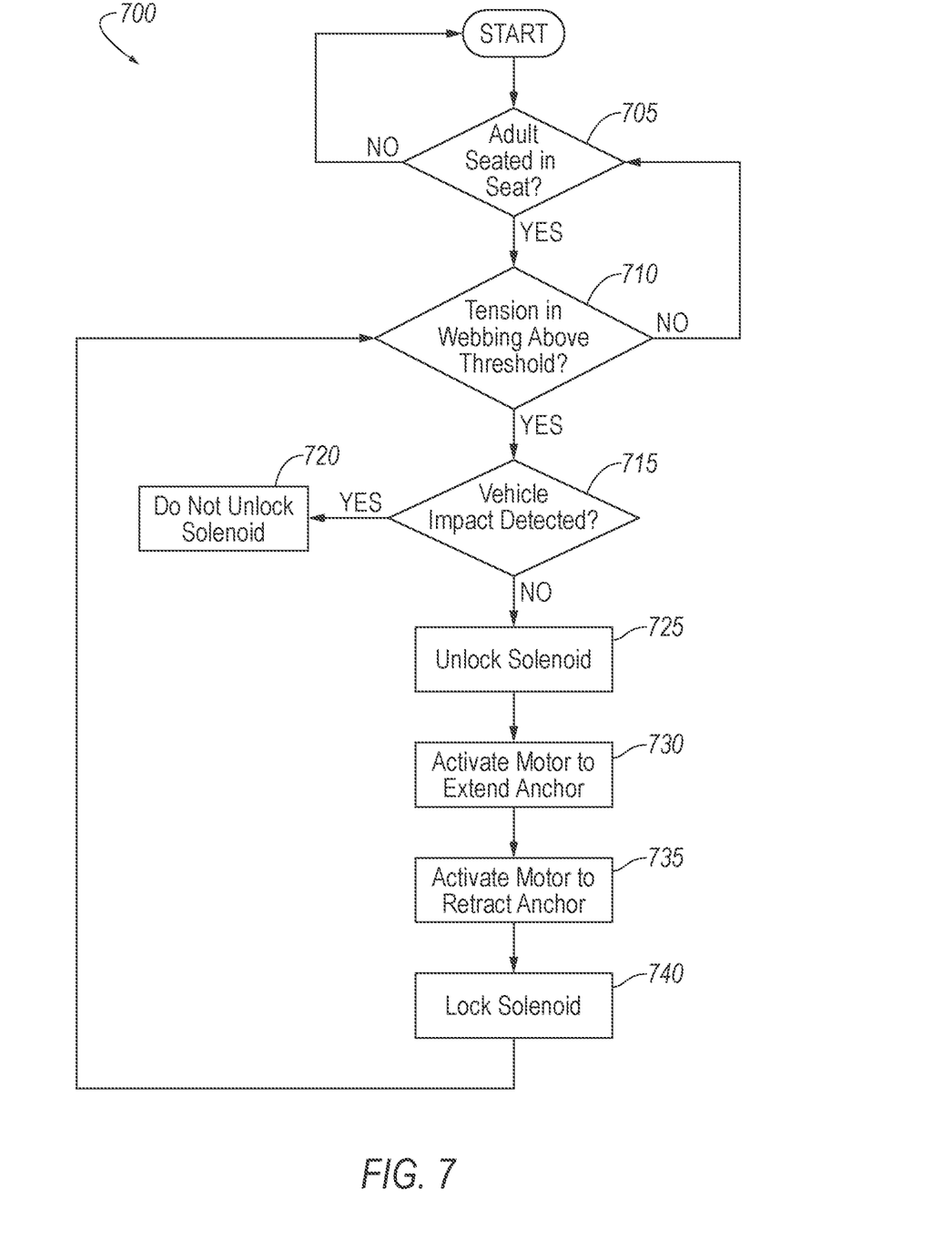
FIG. 7 is a flowchart illustrating an example process for controlling the position of the seatbelt anchor.

The vehicle 28 may include a computer 18 having a processor and a memory storing instructions executable by the processor to perform the process described herein, including the example process in FIG. 7. The computer 18 may be, for example, a restraints control module. Use of "in response to," "based on," and "upon determining" herein indicates a causal relationship, not merely a temporal relationship. The computer 18 may operate the motor 16 and the lock 26 based on input from other components that, for example, detect the size of an occupant in the seat 32, the level of tension in the seatbelt webbing 14, a vehicle impact, etc. As an example and as described further below, the system 10 may include an occupant-classification system 52 (OCS), an impact sensor 54, a seatbelt-tension sensor 56, and a latch sensor 58.

Figure 6:
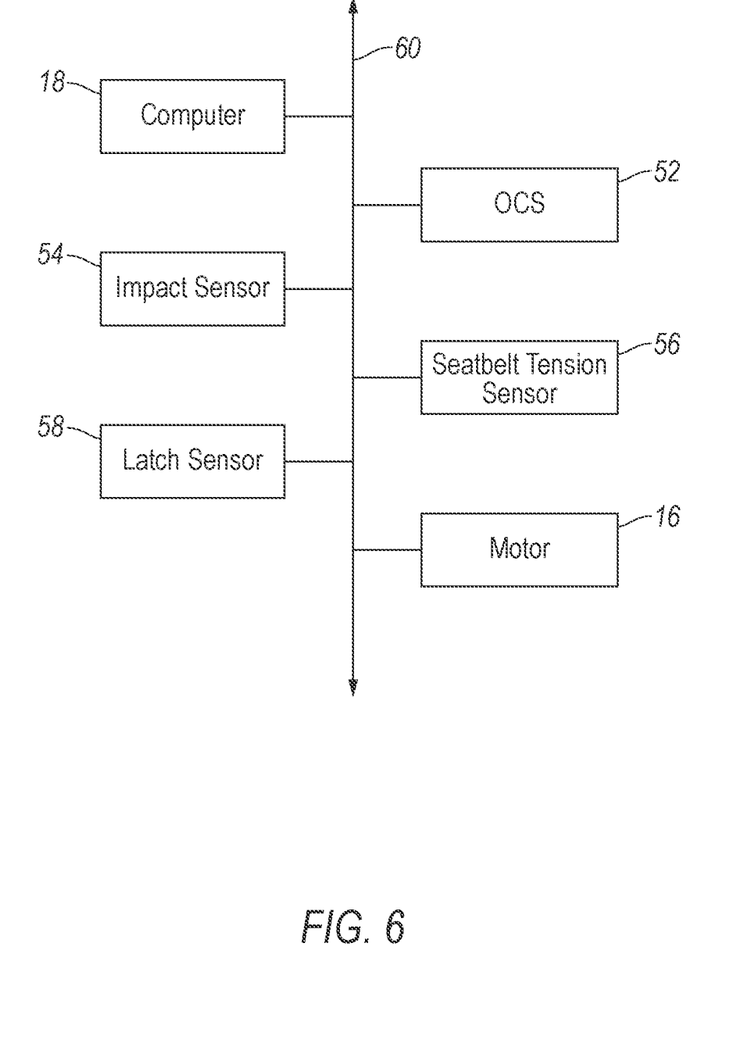
FIG. 6 is a block diagram of a system of the vehicle.

As set forth above, the system 10 may include an occupant-classification sensor. Specifically, the system 10 may include an occupant-classification system 10 (OCS), as shown in FIG. 6, and the OCS 52 includes the occupant-classification sensor. The OCS 52 may be of a conventional type currently known in the art. The occupant-classification sensor detects at least one size measurement of the occupant, e.g., weight, width, height, etc. As an example, the occupant-classification sensor may be a weight sensor in the seat 32 for detecting the weight of the occupant. In such an example, the weight sensor may include a sealed bladder and a pressure sensor in communication with the sealed bladder for detecting pressure changes in the bladder when an occupant sits on the seat 32. As another example, the occupant-classification sensor may be a camera in the passenger cabin for detecting the size and/or shape of the occupant. In such an example, the camera can detect electromagnetic radiation in some range of wavelengths. For example, the camera may detect visible light, infrared radiation, ultraviolet light, or some range of wavelengths including visible, infrared, and/or ultraviolet light. For example, the camera 205 can be a charge-coupled device (CCD), complementary metal oxide semiconductor (CMOS), or any other suitable type. The camera may be positioned such that a field of view of the camera encompasses the seat 32. Based on the detection by the occupant-classification sensor, the OCS 52 determines the size of an occupant seated in the seat 32. The size of the occupant may be classified based on anthropomorphic size. As examples, the OCS 52 may classify the occupant as being within a size range associated with an adult occupant, e.g., $5^{th}$ percentile female to $95^{th}$ percentile male, a child seat 32, etc.

The system 10 can include an impact sensor 54 that is configured to detect an impact to the vehicle 28. The impact sensor 54 may be, as an example, the impact sensor 54 may be of a conventional type currently known in the art. The impact sensor 54 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The vehicle 28 may include multiple impact sensors 54 located at numerous points in or on the vehicle 28.

The system 10 may include a seatbelt-tension sensor 56 coupled to the seatbelt webbing 14. The seatbelt-tension sensor 56 detects the level of tension in the seatbelt webbing 14 resulting from forces exerted by the occupant on the seatbelt webbing 14 when the latch plate 38 is engaged with the buckle 36 and the seatbelt retractor 30 is locked. The seatbelt-tension sensor 56 may be of a conventional type currently known in the art. The seatbelt-tension sensor 56 may include a strain gage, or other suitable structure. The seatbelt-tension sensor 56 can be supported at, e.g., fixed to, the seatbelt anchor 12 connected to the seatbelt webbing 14, or at any other suitable location. Tension of the seatbelt webbing 14 may generate strain in the seatbelt anchor 12 and the seatbelt-tension sensor 56 may detect such strain.

The system 10 may include a latch sensor 58 that detects when the latch plate 38 is buckled, i.e., when the latch plate 38 is engaged with the buckle 36. The latch sensor 58 may be a switch, a proximity sensor, or any suitable sensor. The latch sensor 58 may be support by the buckle 36.

With reference to FIG. 7, the process 700 controls movement of the position of the seatbelt anchor 12 in the first position and the extended position. The process 700 starts with the vehicle 28 operating under typical conditions, e.g., with the latch plate 38 buckled into the buckle 36, with tension in the seatbelt webbing 14 below the threshold amount, with the buckle 36 in the first position, without having detected an impact to the vehicle 28, with the lock 26 in the locked position, etc. The computer 18 collects data, e.g., from the latch sensor 58, the seatbelt-tension sensor 56, the impact sensor 54, etc. . . . , via the communication network. The computer 18 may collect such data continuously, at intervals (e.g., every milliseconds), etc. The computer 18 may collect such data throughout the process.

With reference to blocks 705, the process 700 includes detecting the size of an occupant of the seat 32 and to control operation of the lock 26 and motor 16 based on the detected size of the occupant. At block 705, the process 700 included determining whether an adult is in the seat 32. At the start of block 705, the process can include determining whether the latch plate 38 is buckled or unbuckled from the buckle 36, e.g., based on data received from the latch sensor 58. In block 705 may include detection and classification of the size of the occupant by the OCS 52, as described above. In the event the seat 32 is occupied by an occupant other than and adult human, e.g., occupied by a child seat 32, the process 700 returns to the start. In the event the seat 32 is occupied by an adult, the process 700 continues to block 710.

Next at a block 710, the process includes determining whether tension of the seatbelt webbing 14 is above or below the predetermined threshold, e.g., based on data collected by the seatbelt-tension sensor 56. For example, the computer 18 may compare the tension in the seatbelt webbing 14 indicated in the data collected by the seatbelt-tension sensor 56. In response to determining that the tension of the seatbelt webbing 14 is below the threshold, the process 700 to the block 705. In response to determining the tension of the seatbelt webbing 14 is above the threshold, the computer 18 moves to the block 715.

In block 715, the process includes determining whether a vehicle impact has been detected. In response to determining that a vehicle impact has not been detected the process moves to block 720. At block 720, the lock 26 is maintained in the engaged position to lock 26 the seatbelt anchor 12 in the first position.

In response to determining that a vehicle impact has not been detected the computer 18 moves to a block 725. In other words, at block 725, an adult occupant is seated in the seat 32, the tension in the seatbelt webbing 14 is above the threshold (e.g., due to the seatbelt retractor 30 being in the locked position and force being exerted on the seatbelt webbing 14 by the occupant), and no vehicle impact is detected. In such a condition, the seatbelt retractor 30 is unnecessarily in the locked position and the process 700 includes moving the seatbelt anchor 12 to the extended position to allow the seatbelt retractor 30 to move to the unlocked position in blocks 725 and 730.

Specifically, in block 725, the process 700 includes unlocking the lock 26 to allow the moveable segment 24 to move relative to the base segment 22 from the first position to the extended position. In the example shown in the Figures in which the lock 26 is the solenoid, the plunger 48 is moved to the retracted position to disengage the hole 50 in the moveable segment 24 to unlock 26 the moveable segment 24 from the base segment 22.

At block 730, the process includes activating the motor 16 to move the seatbelt anchor 12 to the extended position. Specifically, with the lock 26 in the unlocked position, in the example shown in the Figures the motor 16 turns the pinion 42 to move the rack 42 to extend the moveable segment 24 relative to the base segment 22 to the extended position. When the moveable segment 24 moves to the extended position, tension in the seatbelt webbing 14 is relieved, which allows the seatbelt retractor 30 to move to the unlocked position.

At blocks 735 and 740, the process includes returning the seatbelt anchor 12 to the first position and locking the seatbelt anchor 12 in the first position. Specifically, in block 735, after the moveable segment 24 was moved to the extended position in block 730, the process 700 includes activating the motor 16 to move the seatbelt anchor 12 to the first position. Specifically, the motor 16 turns the pinion 42 to move the react to retract the moveable segment 24 relative to the base segment 22 to the first position. When in the first position, the process 700 includes locking the lock 26 to lock 26 the moveable segment 24 relative to the base segment 22 in the first position, as shown in block 740. In the example shown in the Figures in which the lock 26 is the solenoid, the plunger 48 is aligned with the hole 50 in the first position and the plunger 48 is moved to the extended position to engage the hole 50 in the moveable segment 24 to lock 26 the moveable segment 24 to the base segment 22. After block 740, the process 700 returns to the start.

As set forth above, the computer 18 includes a processor and a memory. The memory includes one or more forms of computer readable media, and stores instructions executable by the computer 18 for performing various operations, including as disclosed herein. For example, the computer 18 can be a generic computer 18 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 18 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal system 10s such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 18. The memory can be of any type, e.g., hard disk drives, solid state drives, servers, or any volatile or non-volatile media. The memory can store the collected data sent from the sensors.

The computer 18 is generally arranged for communications on a communication network 60 that can include a bus in the vehicle 28 such as a controller area network (CAN) or the like, and/or other wired and/or wireless mechanisms. Via the communication network 60, the computer 18 may transmit messages to various devices in the vehicle 28, and/or receive messages (e.g., CAN messages) from the various devices, e.g., the various sensors, etc. Alternatively or additionally, in cases where the computer 18 comprises a plurality of devices, the communication network may be used for communications between devices represented as the computer 18 in this disclosure.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer 18 readable media. A file in a networked device is generally a collection of data stored on a computer readable medium, such as a storage medium, a random-access memory, etc. A computer readable medium includes any medium that participates in providing data e.g., instructions, which may be read by a computer 18. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 18. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a seatbelt anchor;
seatbelt webbing extending from the seatbelt anchor;
a motor operatively coupled to the seatbelt anchor to move the seatbelt anchor between a first position and an extended position; and
a computer having a processor and a memory storing instructions executable by the processor to activate the motor to move the seatbelt anchor from the first position to the extended position while the seatbelt webbing is buckled across an occupant in response to determining that tension in the seatbelt webbing is above a predetermined threshold in the absence of detection of a vehicle impact.

2. The system of claim 1, wherein the memory stores instructions executable by the processor to, after moving the seatbelt anchor to the extended position, activate the motor to return the seatbelt anchor to the first position in response to determining that the tension in the seatbelt webbing is below the threshold.

3. The system of claim 1, wherein the seatbelt anchor includes a base segment and a moveable segment moveable relative to the base segment between the first position and the extended position.

4. The system of claim 3, further comprising a lock moveable between an engaged position engaged with the moveable segment in the first position and a disengaged position disengaged with the moveable segment, the solenoid in the extended position locking the moveable segment relative to the engaged position in the first position.

5. The system of claim 4, wherein the memory stores instructions executable by the processor to, in response to determining that tension in the seatbelt webbing is above a predetermined threshold in the absence of detection of a vehicle impact, move the lock to the disengaged position prior to activating the motor.

6. The system of claim 4, further comprising a rack on one of the motor and the moveable segment and a pinion on the other of the motor and the moveable segment, the pinion being meshed with the rack.

7. The system of claim 6, wherein the motor is fixed to the base segment of the seatbelt anchor.

8. The system of claim 4, wherein the lock is fixed to the base segment of the seatbelt anchor.

9. The system of claim 4, wherein the lock is a solenoid.

10. The system of claim 1, further comprising a seatbelt-tension sensor coupled to the seatbelt webbing.

11. The system of claim 1, further comprising a buckle spaced from the seatbelt anchor and a latch plate slidably engaged on the seatbelt webbing, the clip being releasably engageable with the buckle.

12. The system of claim 1, further comprising an occupant-classification sensor, the memory storing instructions executable by the processor to detect the size of an occupant of the seat and to control operation of the solenoid and motor based on the detected size of the occupant.

13. A seatbelt assembly comprising:
a seatbelt anchor having a base segment and a moveable segment moveable relative to the base segment between a first position and an extended position;
seatbelt webbing extending from the seatbelt anchor;
a motor operatively coupled to the anchor to move the moveable segment between the first position and the extended position;
a lock moveable between an engaged position engaged with the moveable segment in the first position and a disengaged position disengaged with the moveable segment, the solenoid in the extended position locking the moveable segment relative to the engaged position in the first position; and
a computer having a processor and a memory storing instructions executable by the processor to, in response to determining that tension in the seatbelt webbing is above a
predetermined threshold in the absence of detection of a vehicle impact, move the lock to the disengaged position and activate the motor to move the moveable segment relative to the base segment from the first position to the extended position while the seatbelt webbing is buckled across an occupant.

14. The seatbelt assembly of claim 13, further comprising a rack on one of the motor and the moveable segment and a pinion on the other of the motor and the moveable segment, the pinion being meshed with the rack.

15. The seatbelt assembly of claim 13, wherein the motor is fixed to the base segment of the seatbelt anchor.

16. The seatbelt assembly of claim 13, wherein the lock is fixed to the base segment of the seatbelt anchor.

17. The system of claim 13, wherein the memory stores instructions executable by the processor to, after moving the seatbelt anchor to the extended position, activate the motor to return the seatbelt anchor to the first position in response to determining that the tension in the seatbelt webbing is below the threshold.

18. The system of claim 13, further comprising a seatbelt-tension sensor coupled to the seatbelt webbing.

19. The system of claim 12, further comprising an occupant-classification sensor, the memory storing instructions executable by the processor to detect the size of an occupant of the seat and to control operation of the lock and motor based on the detected size of the occupant.

20. The system of claim 13, wherein the lock is a solenoid.

* * * * *